United States Patent
Langberg et al.

(10) Patent No.: US 7,352,805 B2
(45) Date of Patent: Apr. 1, 2008

(54) SYSTEMS AND METHODS FOR ADAPTIVE VDSL WITH VARIABLE SAMPLING FREQUENCY AND TIME-DOMAIN EQUALIZER

(75) Inventors: Ehud Langberg, Wayside, NJ (US); Lujing Cai, Morganville, NJ (US)

(73) Assignee: Conexant, Inc., Red Bank, NJ (US)

( * ) Notice: Subject to any disclaimer, the term of this patent is extended or adjusted under 35 U.S.C. 154(b) by 0 days.

(21) Appl. No.: 11/282,109

(22) Filed: Nov. 18, 2005

(65) Prior Publication Data

US 2006/0104339 A1    May 18, 2006

Related U.S. Application Data

(60) Provisional application No. 60/628,816, filed on Nov. 18, 2004.

(51) Int. Cl.
*H03H 7/30* (2006.01)

(52) U.S. Cl. ............... 375/229; 375/222; 375/219

(58) Field of Classification Search ............... 375/222, 375/219, 220, 221, 260, 261, 298; 370/203, 370/210, 206; 455/557

See application file for complete search history.

(56) References Cited

U.S. PATENT DOCUMENTS

| | | | |
|---|---|---|---|
| 6,678,318 B1 * | 1/2004 | Lai | 375/232 |
| 6,690,717 B1 * | 2/2004 | Kim et al. | 375/219 |
| 7,010,027 B1 * | 3/2006 | Mestdagh et al. | 375/222 |
| 7,072,391 B2 * | 7/2006 | Oksman et al. | 375/222 |
| 2002/0006167 A1 * | 1/2002 | McFarland | 375/260 |

* cited by examiner

*Primary Examiner*—Chieh M. Fan
*Assistant Examiner*—Jaison Joseph
(74) *Attorney, Agent, or Firm*—Thomas, Kayden, Horstemeyer & Risley LLP

(57) ABSTRACT

A method and system for enhancing reach-performance of a multi-carrier VDSL System estimates loop length, estimates maximum available bandwidth that can be utilized at that particular loop length, optimally selects an FFT size and sampling rate, and decides whether to apply a time domain equalization to its receiver and if so, selects a cyclic extension size. To minimize the implementation complexity, the sampling frequencies at receiver and transmitter are lowered to match the actual usable bandwidth. The FFT/IFFT sizes in the implementation are also required to set appropriately accordingly.

15 Claims, 3 Drawing Sheets

Adaptive VDSL System

Figure 1: VDSL system

Figure 2: Adaptive VDSL System

Figure 3: Adaptation Procedure Flow Chart

SYSTEMS AND METHODS FOR ADAPTIVE VDSL WITH VARIABLE SAMPLING FREQUENCY AND TIME-DOMAIN EQUALIZER

CROSS REFERENCE TO RELATED APPLICATIONS

This application claims priority to U.S. provisional patent application 60/628,816, filed Nov. 18, 2004, entitled "Method and System For Adaptive VDSL System with Variable Sampling Frequency and Time-Domain-Equalizer," which, is hereby incorporated by reference in its entirety.

FIELD OF THE INVENTION

The invention relates generally to point-to-point land-line communications systems and more specifically to a systems and methods for implementing adaptive very high data rate digital subscriber line (VDSL) over telephone switched networks with variable sampling frequency and time-domain equalizer.

BACKGROUND OF THE INVENTION

The explosive growth of the Internet has created a demand for high data rates for business and residential users (SOHO—small office/home office). Because of the prevalence of twisted pair copper wires in existing telephone networks, much of the demand must be met by data communication protocols that are adapted to transmit data over these standard analog plain old telephone systems (POTS) lines. The need for high-speed access to the home and businesses appears to be ever increasing due in part to the availability of information, data, high-bandwidth video and the like from the World Wide Web. Because of this ever increasing demand, higher speed modems are required.

Originally data transmission over POTS lines was accomplished using voice/data modems. These devices modulate data just like voice signals. As a result their theoretical data transfer speed limit is insufficient to deliver broadband content. Current voice/data modems operate at a maximum data transfer speed of up to 56.6K bits/second.

Due to the shortcomings of voice/data modems, the industry looked for new solutions for delivering high speed data access over existing twisted pair copper telephone lines. One result of these efforts was the emergence of digital subscriber line technology (xDSL). As used herein "xDSL" is understood to denote any type of DSL service (e.g., ADSL, DMT-based VDSL, VDSL2, etc.). DSL provides high speed data transmission over relative short distances of twisted pair lines by utilizing the portion of the available bandwidth in the twisted pair above the few thousand kilohertz utilized by voice communications. Thus, the available bandwidth is divided into three bands: the lowest frequency band allocated to voice communications, then, the next band allocated to upstream data transfer while the remaining higher bandwidth, the majority, is reserved for downstream data communications. Filters are used to prevent interference between bands. Within the upstream and downstream bands, the available bandwidth is further divided into harmonically related sub-carriers or tones approximately 4 KHz in width on which data is simultaneously transferred. Because of bandwidth limitation (4 KHz), and power limitation of the telephone network, line coding schemes are used to encode digital signals into analog signals that convey the analog information over the analog telephone network. The line coding schemes manipulate the analog carrier signal, which has three attributes, amplitude, phase and frequency. One or more of such attributes may be manipulated by known modulation techniques such as, for example, quadrature amplitude modulation (QAM) whereby the carrier signal's phase and amplitude are modulated to encode more data within a frequency bandwidth. One example of a QAM modulation system sends two bits of information per QAM symbol, where the digital values can be encoded and the corresponding amplitude and phase can be represented using a constellation. Increasing the constellation size, that is number of points (bits), will cause the bit density per symbol to increase, and hence achieve higher data rates.

An upper limit on this process of constellation mapping stems from the fact that as the constellation size increases, the granularity of the phase and the amplitude difference between different constellation points diminishes, making it increasingly difficult to decode the constellation points, especially in the presence of noise. One way of circumventing this problem is to increase the Euclidean distance between symbols by employing trellis coding. Trellis coding is particularly well suited for this because it is bandwidth efficient, since the symbol rate and required bandwidth is not increased. As noted above, as the constellation size gets bigger, the problem of detecting a constellation increases due to the greater symbol density. Therefore, a way of counter-acting the effects the short Euclidean distance between symbols is to partition the quadrature amplitude modulated signal into subsets, thereby creating an acceptable Euclidean distance between symbols.

A property of DSL-based systems is that system performance is directly correlated to loop length, that is, the distance of the channel between the transmitting modem and receiving modem. Unfortunately, the telephony loop introduces severe frequency-dependent attenuation of the signal. In frequency-division multiplexed (FDM) DMT, filters are required to separate upstream from downstream transmission. Hence, the impulse response length of the composite equivalent discrete channel depends not only on the cable characteristics, but also on the impulse responses of the transceiver filters and service splitter—plain old telephone service (POTS) or integrated services digital network (ISDN)—included in the end-to-end signal path. The non-zero impulse response length results in inter-DMT symbol interference. This can be avoided by inserting a cyclic prefix (a copy of the last samples of the DMT symbol) between DMT symbols. The length of the prefix (samples) must be longer than the memory of the channel. In doing so, orthogonality between the carriers of the same symbol is also restored. The transient at the beginning of each DMT symbol (introduced by transmission over the channel) is absorbed in the prefix, which is removed at the receiver. The outputs of the demodulating FFT then equal the transmitted QAM symbols multiplied by the channel transfer function taken at the carrier frequencies. Hence, channel equalization is easily performed by multiplying each FFT output with a single complex coefficient equal to the inverse of the channel transfer function at the corresponding frequency.

As noted above, loop attenuation due to inter-symbol interference is greatest at the highest frequency tones. As the loop gets longer, the loop attention at the higher frequencies will be much larger than at lower frequencies. When attenuation on a particular sub-carrier gets to be too great, that sub-carrier is effectively turned off. Therefore, the maximum usable bandwidth in a DSL system is a non-linear, monotonically decreasing function of loop length. In conventional DSL systems, approximately 3.5 miles or about 18,000 feet is the maximum loop length at which acceptable performance can be maintained. While cyclic extension and equalization may be used to allow longer loop lengths, the length of the extension must be greater as the loop length increase. Transmitting this redundant data decreases the effective data transfer rate. Also, because loop conditions may change, setting a particular extension length and sampling frequency fails to accommodate changes in loop conditions.

SUMMARY OF THE INVENTION

In view of the shortcomings of conventional DSL systems as discussed above, various embodiments of the present invention provide an adaptive VDSL system that is intended to improve and in some cases optimize system performance along a range of loop lengths. In at least one embodiment, the invention may be implemented in a method having the following form: 1) the transmitter sends a line probing signal of any kind of form to the line, with its power and spectrum shape known to the receiver; 2) based on the received line-probing signal, the receiver estimates the loop length of the line (this can be done by estimating the received power, or the shape of the received spectrum); 3) for greater reliability, the receiver can also estimate the noise level relative to the signal, as a result, the signal-to-noise-ratio (SNR) per sub-carrier can be measured; 4) the receiver calculates the maximum usable frequency band based at least in part on one or both of the loop length and the estimated SNR; 5) the receiver determines the FFT size it uses, if the actual maximum usable bandwidth of the line is small, the size of the FFT will be also small, thereby effectively reducing the computational burden when loop length is longer; 6) based on the FFT size, the receiver sampling frequency may be set accordingly; 7) in terms of loop length and computation resource available, the receiver also makes a decision on whether to utilize a time-domain equalizer (TEQ), if yes, it also determines the length of the TEQ; 8) the size of cyclic extension is also determined at the receiver in conjunction with its decision on TEQ; 9) the receiver communicates its decisions, including the size of FFT, transmit sampling frequency, and the size of cyclic extension, to the transmitter; 10) the transmitter sets its transmit sampling frequency, size of cyclic extension, and size of IFFT, respectively; and 11) some or all of those settings are used in the regular data transmission.

In at least one embodiment of the invention a method for performing adaptive xDSL communications is provided. The method for performing adaptive xDSL communications according to this embodiment may comprise determining line conditions of a communications channel connecting a transmitter and a receiver, estimating a maximum number of usable sub-carriers (which may be one, singular, sub-carrier) based on the determined line conditions, wherein the maximum usable sub-carriers is indicative of a maximum usable bandwidth spanning from a lowest frequency usable sub-carrier to the maximum frequency usable sub-carrier, determining a FFT size based at least on part on the maximum number of usable sub-carriers, based at least in part of the determined FFT size, selecting a receiver sampling frequency, determining, based at least in part on the line conditions, whether or not to utilize a time-domain equalizer (TEQ), and if so determining the length of the TEQ and the size of cyclic extension to use, communicating from the receiver to the transmitter the size of the FFT, sampling frequency and if used, size of the cyclic extension.

In at least one other embodiment of the invention an adaptive xDSL system is provided. The adaptive xDSL system according to this embodiment may comprise a first transceiver unit and a second transceiver unit interconnected by a communication channel, wherein the second transceiver is adapted to transmit a training signal to the first transceiver, and the first transceiver is adapted to estimate one or more channel characteristics based on the received training signal, the one or more channel characteristics including at least a channel loop length separating the first and second transceiver units, calculate a maximum usable bandwidth between the first and second transceiver over the channel, select a minimum size of an FFT to be implemented by the second transceiver unit; based on the selected size of the FFT, select a minimum sampling frequency; determine whether, based at least in part on the one or more channel characteristics, a TEQ should be used and, if so, selecting a length of the TEQ and a cyclic extension length, and transmit to the second transceiver unit determined parameters including the size of the FFT, the sample frequency and the determined to be necessary, the size of the cyclic extension to use, wherein the second transceiver is adapted to set an FFT having a size corresponding to the FFT size and to transmit data to the first transceiver using the determined parameters.

Yet another embodiment of this invention may provide a chipset for an adaptive VDSL modem. The chipset for an adaptive VDSL modem according to this embodiment may comprise circuitry adapted to receive a training signal, circuitry adapted to estimate a loop length traveled by the training signal based on estimated properties the received training signal, circuitry adapted to calculate a maximum usable bandwidth over a communication channel traveled by the training signal, circuitry adapted to select a sampling frequency based on the maximum usable bandwidth, circuitry adapted to select a minimum size of an FFT for transforming a DMT-based signal received over the communication channel based on the sampling, circuitry adapted to determine, based on at least in part on the estimated loop length, whether a TEQ should be used on received signals and, if so, to select a TEQ length and a cyclic extension length, and circuitry adapted to send a signal back to a transmitting device indicative of the selected sampling frequency, FFT size and if determined, the cyclic extension length.

These and other embodiments and advantages of the present invention will become apparent from the following detailed description, taken in conjunction with the accompanying drawings, illustrating by way of example the principles of the invention

BRIEF DESCRIPTION OF THE DRAWINGS

The present invention can be understood more completely by reading the following Detailed Description of the Invention, in conjunction with the accompanying drawings and tables.

DETAILED DESCRIPTION OF THE INVENTION

The following description is intended to convey a thorough understanding of the present invention by providing a number of specific embodiments and details involving data transmission in multiple carrier systems. Such systems may use multiplexing or diversity techniques. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

It should be appreciated that it is intended that the various embodiments of the invention shall be applicable to both upstream and downstream data directions. In this manner, the invention offers the advantages of enhancing performance of the VDSL system at a range of loop lengths and reducing system implementation cost.

Figure 1:
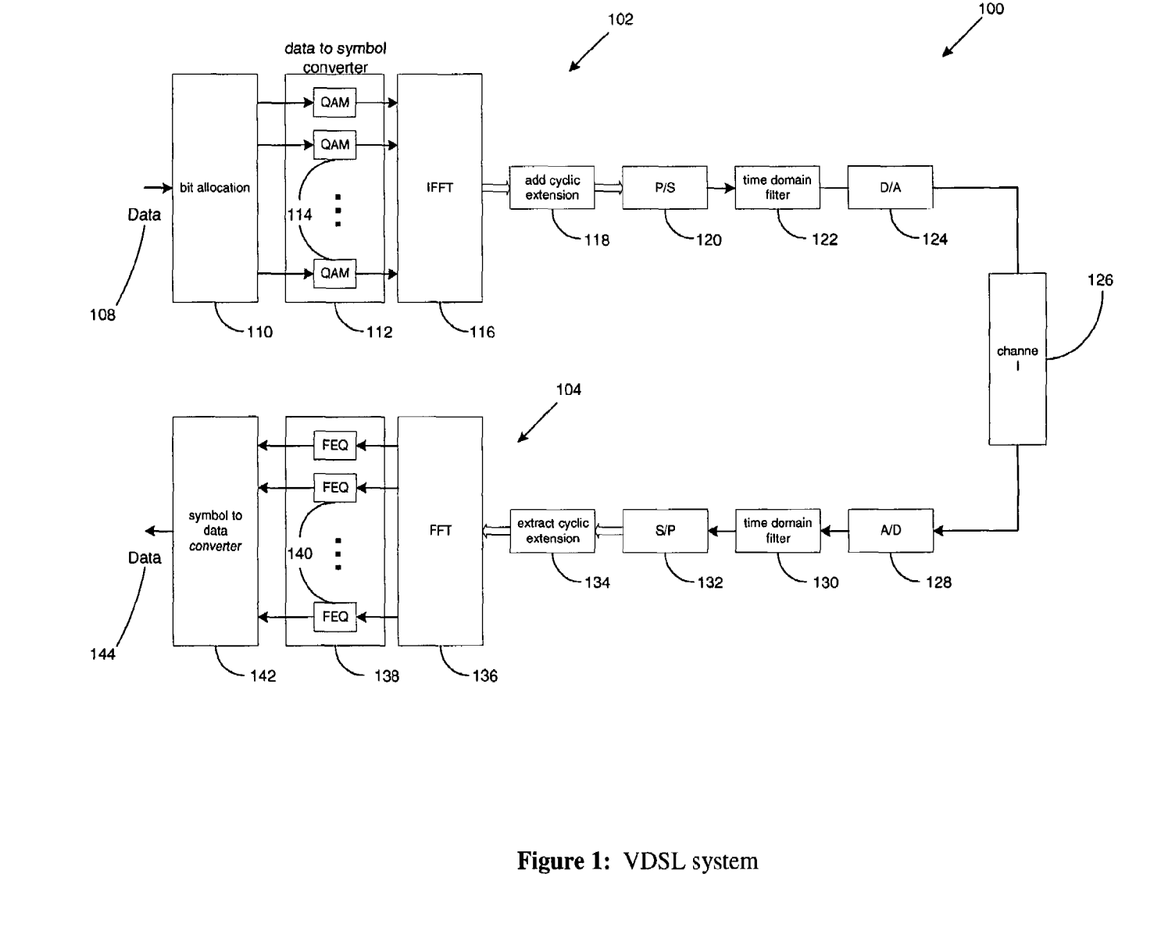
FIG. 1 is a schematic diagram illustrating an exemplary multiple channel, multiple carrier-based system for transmitting data such as used in a conventional VDSL communication system.
Figure 2:
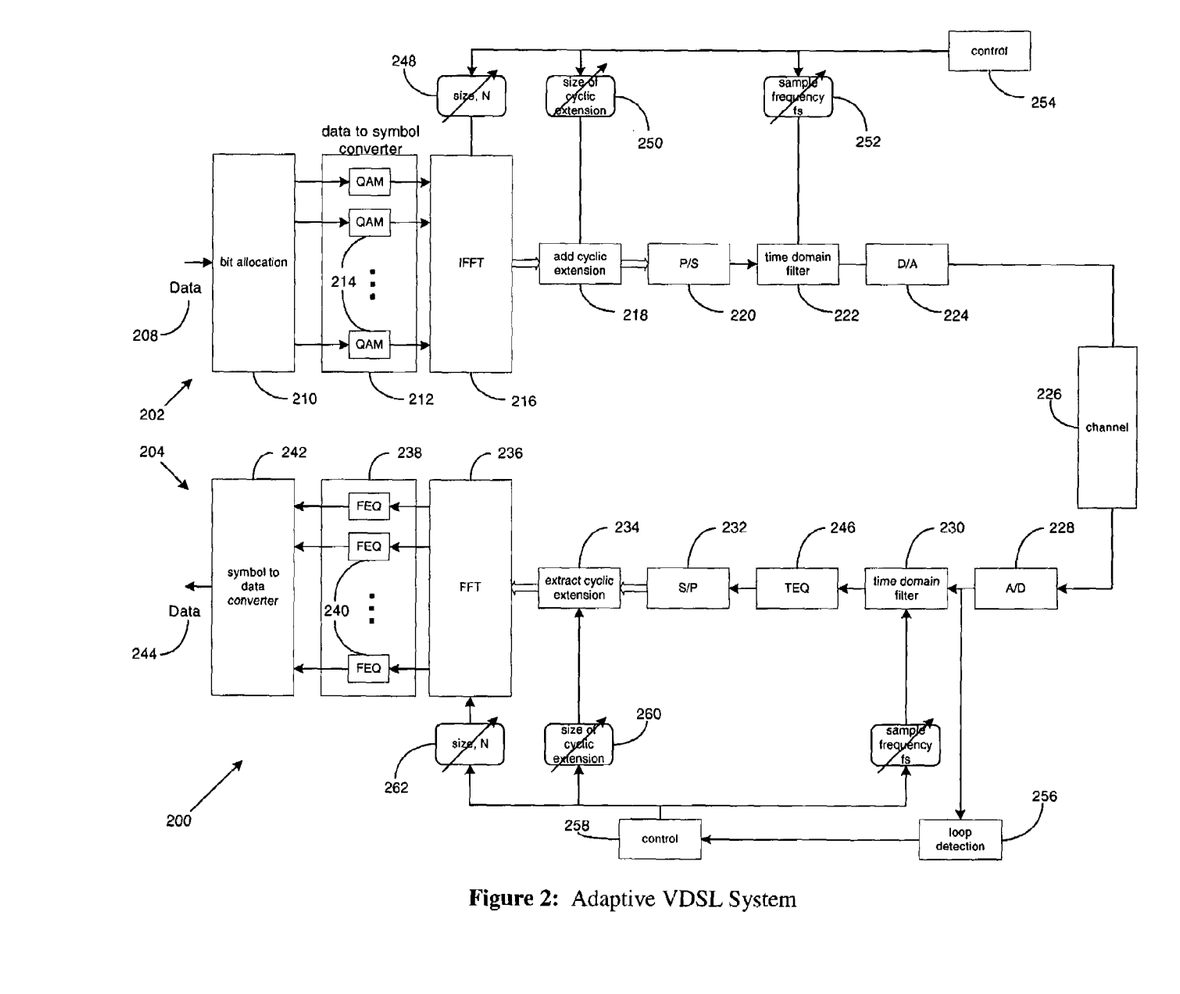
FIG. 2 is a schematic diagram illustrating an exemplary multiple channel, multiple carrier-based system for transmitting data according to at least one embodiment of the invention.
Figure 3:
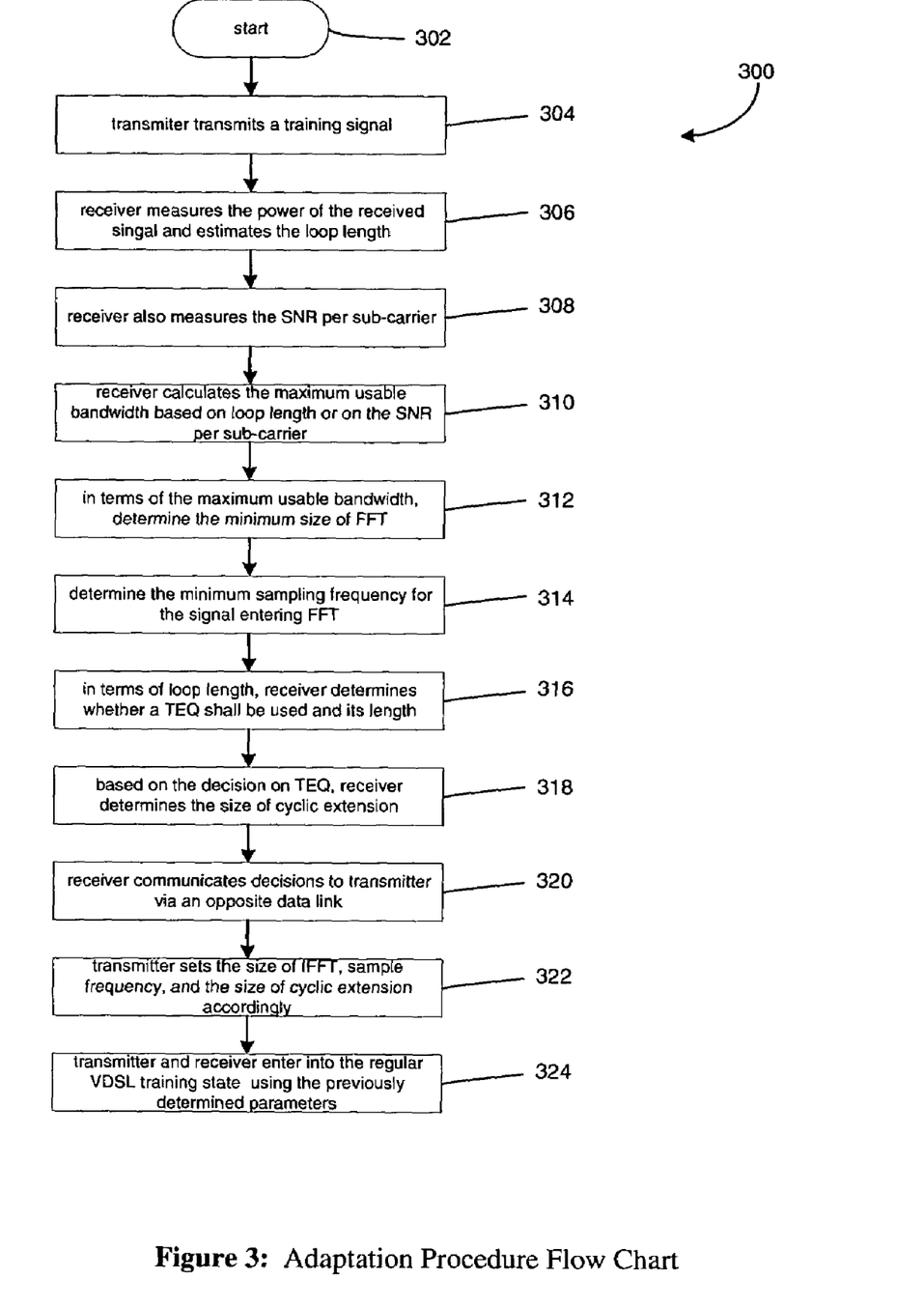
FIG. 3 is a flow chart outlining the steps of a method for performing adaptive VDSL with variable sampling frequency and time domain equalization according to at least one embodiment of the invention.

FIGS. 1-3 illustrate various exemplary systems and procedures for processing and transmitting data in multiple channel, multiple carrier systems. In at least one embodiment, a transmitter (which could be the transmitter portion of a transceiver at either end of the communication channel) may be connected to a receiver (which could be the receiver portion of a transceiver at either end of a communication channel) by two or more bonded channels, where the bonded channels may include a physically isolated medium, such as twisted pair lines or coaxial cable, or wireless "virtual" channels, or a combination thereof. The frequency transmission bandwidths of each of the bonded channels may be segmented into frequency sub-bands, or "tones," and each tone then may be used to transmit a symbol stream in parallel with symbol streams on the other tones using any of a variety of multiple carrier transmission techniques, such as DMT or OFDM. A further description of bonded tones, also referred to as "twin tones", in a multi-channel system is found in U.S. patent application Ser. No. 10/874,329 filed Jun. 24, 2004 to Duvaut et al. entitled Technique For Improving Multiple-Channel Multi-Tone Transmissions, which is incorporated herein by reference and is commonly assigned to the assignee and owner of the present invention and application.

FIG. 1 depicts a multi-carrier VDSL system 100 with major signal processing functions. Multi-carrier transmitter 102 is communicatively connected via channel(s) 126, such as over twisted pair wires, to receiver 104. Channel 126 is typically a multi-channel comprising two or more bonded channels, wherein the bonded channels may include a physically isolated medium, such as twisted pair lines. The frequency transmission bandwidths of each of the bonded channels may be segmented into frequency sub-bands, or "tones," and each tone then may be used to transmit a symbol stream in parallel with symbol streams on the other tones using multiple carrier transmission techniques, such as DMT.

Transceivers are typically used in systems wherein equipment at each end of the signal typically includes a receiver section and a transmitter section. At a customer premises equipment (CPE) the receiver portion is typically considered downstream and the transmitter portion is typically considered communicating data upstream to an intermediate or central device, such as a central office (CO).

Referring now to FIG. 1, an exemplary data transmission system 100 includes data 108 processed at transmitter 102 for communicating over channel 126 to data destination/receiver 104 for ultimate processing and output as data 144. The transmitter 102 and the receiver 104 may be interconnected for data transmission purposes by two or more channels 126. The transmitter/data source 102 may include any of a variety of devices adapted to transmit data over two or more channels using multiple carrier data transmission techniques. Similarly, the receiver/data destination 104 may include any of a variety of devices adapted to receive data transmitted in such a manner. To illustrate, the data source 102 may include, for example, a DSL access multiplexer (DSLAM) and the data destination 104 may include, for example, a DSL customer premise equipment (CPE) (also known as a DSL modem) wherein data is communicated between the DSLAM and DSL CPE using any of a variety of multiple-channel, multiple-carrier techniques, such as, for example, DMT. In the context of DMT-based DSL systems, the physical structure of two or more channels 126 may include, for example, twisted pair lines.

In communications systems, the transmission of data typically is bidirectional. It will be appreciated, therefore, that equipment at the data source transceiver 102 also may be or include a data destination for data transmitted upstream from equipment at the data destination transceiver 104 or another device and that equipment at the data destination transceiver 104 may be or include a data source for transmitting data upstream to equipment at the data source transceiver 102 or another device. Accordingly, the data source 102 and the data destination 104 each may include both a transmitter and a receiver (commonly referred to collectively as a transceiver). Accordingly, although the exemplary embodiments may be described in terms of downstream transmission from data source 102 to data destination 104, it is understood that the techniques apply equally to transmission in the opposite direction.

The transmitter 102, in at least one embodiment, is adapted to transmit data over the channel 126 to the receiver 104 using a DMT-based modulation technique that incorporates both the benefits of diversity and multiplexing. Such a DMT-based technique may be referred to as Twin DMT or TWDMT. As noted above, multiplex techniques for bonded channels often may improve the data transmission rate as two different symbol streams may be transmitted over two separate channels, thereby nearly doubling the overall transmission rate. Although multiplexing is susceptible to signal impairments that may limit the effective reach of multiplex-based transmission techniques, diversity techniques over bonded channels may be used to increase the reach to allow the receiver to more accurately deduce the actual symbol stream.

Transmitter 102 may include an encoder, a mapping module, filters and converters. In the example of the system 100 depicted in FIG. 1, transceiver 102 includes a bit allocation module 110, a data-to-symbol converter module 112, an inverse fast Fourier Transform (IFFT) module 116, a cyclic extension module 118, a parallel-to-serial (P/S) module 120, one or more filters 122, such as a time domain filter, and a digital-to-analog converter 124. Further, the transmitter 102 may include a low pass filter, an analog front end (AFE), and/or a hybrid interface, which may be connected to the transmission medium of respective channels 126.

The components of the transmitter 102 may be implemented as software, hardware, firmware, or a combination thereof. For example, one or more of an encoder, a mapping module, bit allocator 110, data to symbol converter 112, IFFT 116, P/S converter 118 and filter 122 may be implemented as one or more sets of executable instructions adapted to manipulate one or more processors to perform their functions described below. The one or more processors may include a microprocessor or central processing unit (CPU), an application specific integrated circuit (ASIC), a digital signal processor (DSP) and the like. The D/A converter 124 as well as one or more of a low pass filter, an analog front end, and a hybrid interface typically include hardware components but may have aspects implemented in both hardware and software. Further, multiple processing paths may be synchronized such that symbol streams for each channel are synchronized for optimal performance. Accordingly, the transmitter 102 may further include a master clock (not shown) whose time signal may be provided to and used by one or more of the other components of the transmitter. Moreover, the time signal of the master clock may be transmitted over channel 126 to the receiver 104 to synchronize the clock of the receiver to the master clock using any of a variety of clock-synchronization techniques (e.g., the use of a phase locked loop (PLL)).

An exemplary operation of the transmitter 102 involves data supplied as a bit stream 108 to a bit allocation process. The process may include an encoder that encodes the bit stream to include redundant bits. Redundancy typically provides robustness to the resulting transmitted signal and allows the receiver to more accurately reconstruct the transmitted bit stream. Any of a variety of techniques may be implemented to encode the data. For example, the encoder may include a multilevel encoder that employs one or a combination of the following: space-based encoding, time-based encoding, interleaving, trellis coded modulation (TCM), Reed Solomon (RS) coding, and the like. The resulting bit stream may be provided to a data to symbol converter or mapping module 112 whereupon one or more mapping functions (also known as modulation functions) may be applied to the bit stream. Examples of mapping functions that may be beneficially used may include quadrature amplitude modulation (QAM), phase shift keying (PSK), amplitude shift keying (ASK), binary phase shift keying (BPSK), frequency shift keying (FSK), and the like.

Prior to providing the output of the data to symbol converter 112 to the corresponding IFFT at module 116, in one embodiment, space/time pre-processing may be performed on the output. This pre-processing may include introducing channel information into the symbols to be transmitted to compensate for interference between the two or more channels.

The application of the mapping function(s) of the converter 112 to the bit stream typically results in the generation of complex values, each representing a symbol to be transmitted over a respective tone of the corresponding channel. Such complex value(s) generated for some or all of the tones of the frequency spectrum of the bonded channels may be distributed to one of the respective channel processing paths.

The output of the converter 112 is processed and prepared by the channel processing path(s) 116/118/120/122/124 for transmittal over the physical medium of the channel(s) 126. The channel processing path(s) may implement techniques commonly found in DMT-based transmitters and other multiple carrier-based transmission systems. Generally, this processing may include: conversion from the frequency domain to the time domain by the IFFT module(s) 116 using, for example, an IFFT or similar process. The output of the IFFT module(s) 116 then may undergo an add cyclic extension process 118, a parallel-to-serial conversion by the P/S module(s) 120, shape filtering or other types of filtering by the filter(s) 122. The resulting data then may be converted from the digital domain to the analog domain for transmission by the D/A converter(s) 124 and then may be further processed, such as by low pass filter(s) (not shown). The resulting analog signal(s) then may be provided to the analog front ends (not shown) for transmission via hybrid interface to the receiver 104 over the channel(s) 126.

The receiver 104 may include channel processing path(s) 128/130/132/134 for channel(s) 126. The channel processing path(s) may include a hybrid interface, an analog front end, a low pass filter, an analog-to-digital (A/D) converter 128, a shaping filter, a time-domain equalizer 130, a serial-to-parallel (S/P) converter 132, an extract cyclic extension module 134, and a fast Fourier transform (FFT) module 136.

The receiver 104 further may include a frequency equalizer (FEQ) module 138, which may include one or more of a vector FEQ for processing diversity-mode tones and a matrix FEQ for processing multiplex-mode based tones. The receiver 104 also may include a symbol to data or inverse mapping module 142 and decoder to inverse map and decode the output of the FEQs 140 to generate a bit stream 144 that represents the bit stream provided to the bit allocation module 110 of the transmitter 102. As with transmitter 102, the components of the receiver 104 may be implemented as software, hardware, firmware, or a combination thereof. Also, as with the transmitter 102, the hybrid interface, analog front end, low pass filter and A/D converter 128 typically include hardware components but may have aspects of both hardware and software. The shaping filter, TEQ 130, S/P converter 132, FFT 136, vector/matrix FEQs 138, inverse mapping module 142 and decoder typically are implemented as one or more sets of executable instructions adapted to manipulate one or more processors to perform the functions described below. It should be understood that alternative configurations of hardware and software may be implemented as contemplated by the present invention.

It should be appreciated that the receiver 104 additionally may include a master clock to synchronize some or all of the receiver components so that the incoming symbol stream of each channel may be processed in parallel with the symbol stream of the other channel. Further, the master clock may be synchronized with the master clock of the transmitter 102 using a PLL or other suitable technique.

The channel processing path(s) 128/130/132/134/136 may implement techniques commonly found in DMT-based receivers and other multiple carrier-based reception systems. This preprocessing may be viewed as the inverse or complement of the processing provided by the transmitter channel processing path(s) 116/118/120/122/124 and typically may include: processing by a hybrid module to reduce or remove undesirable effects of the simultaneous transmission and reception of signals over the same channel; processing by an analog front end (analogous to the analog front end of the transmitter); low pass filtering by low pass filter; analog-to-digital conversion by A/D converter 128; and shape filtering.

The output of the shape filter(s) then may be processed by time-domain equalizer (TEQ) module 130. Each channel may be processed by a separate TEQ 130 or may be cross-coupled to process multiple channels by a common TEQ to use the information in one channel to reduce the interference it caused in the other channel. The output of the TEQ(s) then may undergo a serial-to-parallel conversion by the S/P module 142. The serialized output then may be converted from the time domain to the frequency domain by the FFT module 136 using an FFT or similar process. The resulting processed signal for each channel then may be supplied to both the vector and/or matrix FEQ(s) 138.

Received signals for channel(s) 126, respectively, may be processed by the FEQ 138, for instance by using a vector FEQ function to derive an estimate of the complex value originally transmitted. An appropriate vector FEQ function may be determined, for instance, by using any of a variety of techniques, such as, for example, a least-mean-squared approach or a maximum-likelihood approach. The vector FEQ function may be derived during training and/or periodically during operation.

The derived estimated complex values (representing the transmitted symbols) then may be submitted to the converter/inverse mapping module 142 and decoder for inverse mapping and decoding to generate a bit stream 144 representative of the bit stream 108 supplied to the bit allocation module/encoder 110 of the transmitter 102. The inverse mapping process implemented by the inverse mapping/data converter module 142 preferably is compatible with the mapping process implemented by the converter/mapping module 112 of the transmitter 102. Likewise, the decoding process implemented by the decoder preferably is compatible with the encoding process implemented by the encoder of the transmitter 102. The resulting bit stream 144 may be further processed as appropriate for use by the data destination or other device at the receiver 104.

At this point it should be noted that the techniques discussed herein for use in multiple-channel multi-tone transmissions typically involve processing input data and generating output data. This input data processing and output data generation may be implemented in hardware or software. For example, specific electronic components may be employed in a computer and/or communications network or similar or related circuitry for implementing the functions associated with multiple-channel multi-tone transmissions in accordance with the present invention as described above. Also, one or more processors operating in accordance with stored instructions may implement the functions associated with multiple-channel multi-tone transmissions in accordance with the present disclosure as described above. If such is the case, it is within the scope of the present invention that such instructions may be stored on one or more processor readable carriers (e.g., a magnetic disk), or transmitted to one or more processors via one or more signals.

With reference to data-to-symbol converter 112 of transmitter 102, assume the number of sub-carriers used to pass data in the multi-carrier system is $N_{sc}$. In this example, each sub-carrier may be modulated by, for example, a QAM symbol that represents a segment of binary data with variable number of bits. When the binary data stream 108 to be transmitted arrives, the bit allocation function/module 110 disassembles the data and assigns the data to the sub-carriers according to a pre-determined bit map table that is based on the measured and/or estimated properties of each sub-carrier. This results in a 2-D symbol being generated for each sub-carrier that serves as the input to the IFFT 116. In this example, the coding processing blocks (Trellis and Reed Solomon) are ignored for simplicity.

With regard to IFFT 116, the function of the IFFT 116 is to convert the DMT symbols to time domain. The order of the IFFT will be as specified below in Expression 1:

$$N = 2N_{sc} \quad (1)$$

To maintain real-valued output, the N complex values inputting to the IFFT are obtained by Expression 2:

$$Z'_i = \begin{cases} Z_i & i = 0, 1, \ldots, N_{sc} - 1 \\ conj(Z_{N-i}), & i = N_{sc}, N_{sc} + 1, \ldots, N - 1 \end{cases} \quad (2)$$

where $Z_i$ is the complex symbol for the $i^{th}$ sub-carrier. The IFFT function is then implemented according to Expression 3 as follows:

$$x_k = \sum_{i=0}^{N-1} Z'_i \exp(j2\pi ki/N)$$

where $x_k$ is the time domain samples.

To take advantage of the fast Fourier transform, the IFFT has to have an order equal to power of two with 512, 1024, 2048, 4096, 8192 being typical values in use. The sampling frequency associated with $x_k$, denoted as $f_s$, is a function of the size of IFFT and the symbol frequency $f_{sym}$. Assuming, for example, $f_{sym} = 4.3125$ kHz, a very typical setting used in the DMT system, the corresponding set of sample frequencies is given in the Table 1 below:

TABLE 1

| | IFFT/FFT size | | | | |
|---|---|---|---|---|---|
| | 512 | 1024 | 2048 | 4096 | 8129 |
| fs (kHz) | 2208 | 4416 | 8832 | 17664 | 35328 |

Cyclic extension includes cyclic prefix and cyclic suffix. These are the portions of samples manually added that duplicate part of the $x_k$, k=0, 1, 2, ... N−1. These additional samples are likely to be contaminated by the channel that introduces inter-symbol interference (ISI) and, at the receiver, are normally discarded. The cyclic prefix appends the duplicated data samples at the beginning of the regular data samples while the cyclic suffix places them at the end.

Without TEQ, the length of the cyclic extension is crucial to the system's ability to handle ISI. The longer the loop length, the bigger the size of cyclic extension required, which results in more overhead and hence lowers the useful data throughput. After the cyclic extension, the parallel data is converted to serial data that feeds continuously into the time domain filter 122, as shown in the P/S block 120 in the FIG. 1.

Time domain transmit filter 122 may be a digital filter and may be applied to the data samples, $x_k$, with the cyclic extension. The filter 122 can also perform the up-sampling function to achieve better spectrum shaping at higher bandwidth. If so, the sample clock at the D/A will be higher than $f_s$. Digital to Analog Converter 124 converts the digital signal to analog. Channel(s) 126 may include a transmit analog front end (AFE), the subscriber loop, and a receiver analog front end and may introduce ISI and other types of interferences and noises. With bridge taps, the ISI normally is more severe. Analog-to-digital (A/D) converter 128 at the front end of the receiver 104 samples the analog signal and converts it to digital form. Time domain receive filter 130 is a digital filter that filters out band noises. It can also serve as a decimation filter that lowers the sampling frequency. After filtering, the data samples are clocked at the sampling frequency that matches the transmitter as shown in Table 1. The sampling frequency is denoted as $f_s$.

Cyclic extension extraction at the receiver involves identifying and discarding cyclic extension added at the transmitter, and typically involves detecting an appropriate symbol boundary. Fast Fourier transform (FFT) 136 at the receiver is configured to have the same order of IFFT 116 as configured in the transmitter. For instance, denoting the input of FFT as $y_k$, k=0, 1, 2, . . . N−1, the FFT is performed according to Expression 4 as follows:

$$Y_i = \sum_{k=0}^{N-1} y_k \exp(-j2\pi ki/N) \quad (4)$$

Only the first $N_{sc}$ data are used. The frequency domain equalizer (FEQ) 138 applies a constant complex scale factor to each of the sub-carriers, which compensates the phase and amplitude distortion caused by the channel. The Symbol-to-data converter 142 recovers the data from each sub-carrier and assembles them back as data 144 to correspond to the original data stream 108.

As noted above, as loop length increases in a DSL system, loop attenuation at higher frequency bands is more significant than at relatively lower frequency bands. As a result, the maximum usable bandwidth will be a monotonically decreasing function of the loop length. In other words, the total number of usable sub-carriers declines as loop length increases.

In the exemplary VDSL system 100 of FIG. 1, $N_{sc}$ is fixed, as are other related parameters. When the number of actual usable sub-carriers reduces at longer loop lengths, the unable-to-use sub-carriers will be simply turned off by feeding zero-energy. The sampling frequency, $f_s$, at both receiver and transmitter remains the same. Although a TEQ may be desirable at such conditions, it will be more difficult to implement with fixed structure.

Therefore, to facilitate TEQ implementation at longer loop lengths, one embodiment of the invention provides a variable system structure that is adaptive in terms of loop length. The sampling frequency, particularly at the receiver, is reduced to facilitate implementation of a TEQ, if the projected number of usable sub-carriers is reduced. Table 2 below provides the relationship between the number of usable sub-carriers and the sampling frequency.

TABLE 2

| | number of usable sub-carriers | | | | |
|---|---|---|---|---|---|
| | <=256 | <=512 and >256 | <=1024 and >512 | <=2048 and >1024 | <=4096 and >2048 |
| fs (kHz) | 2208 | 4416 | 8832 | 17664 | 35328 |

The FFT size is set according to Table 1. The size of the TEQ is adjustable depending on the computation resources available. The decision is made in conjunction with the selection of the size of cyclic extension. For further reducing the implementation complexity of the transmitter, the above settings of the receiver are communicated to the transmitter where the corresponding setup can be made.

Referring now to FIG. 2, a VDSL system having variable sampling frequency and TEQ in accordance with at least one embodiment of the invention is illustrated. Note that many of the modules and functions of the VDSL system of FIG. 2 are similar to, and have corresponding reference numbers to, the VDSL system of FIG. 1. For brevity, the common functional and structural aspects will not be repeated in this description of the system of FIG. 2. In various embodiments, loop length detection may be accomplished by use of a line probing signal. The transmit power of the line probing signal may be known to the receiver 204. A new signal form for this purpose may be specified or the signal format in the current DMT standard (for example, the handshake tones in the g.hs) may be utilized.

In this embodiment of FIG. 2, let $P_t$ be the transmit power, and $P_r$ the received power estimated at receiver 204. The loop attenuation can be estimated by Expression 5 as follows:

$$A_l = -10 \log 10(P_r/P_t) \quad (5)$$

The value of $A_l$ may be used as an index of a table having the one-to-one mapping relation between the loop length and the loop attenuation. This table may be pre-determined based on previous experiments. The following shall describe two ways to estimate the number of usable sub-carriers. One relatively straightforward method is a table look-up, wherein a table is built with a one-to-one mapping relation between the number of usable sub-carriers and the loop length. This table can be either obtained by theoretical calculation or practical experiments.

A second way to detect loop length is to send out a line probing signal with known spectrum shape to the receiver. The receiver estimates the receive power per individual sub-carrier and also measures the noise power in that sub-carrier. As a result, the signal quality, normally denoted by SNR, may be calculated for each sub-carrier. With the availability of the SNR and intended error rate, one can easily determine which sub-carriers may be used to pass data and therefore, the total number of usable sub-carriers. The particular embodiments of the invention are not dependent upon the particular method utilized to detect loop length.

In various embodiments of the invention, parameter settings may be set by using Tables 1 and 2, that is, the sample frequency and the size of the FFT can be determined respectively. The decision as to whether or not to use time domain equalization (TEQ) may be handled as follows: first, it should be determined whether TEQ is needed based in part on the loop length and frequency band used, and, if yes, then determine if TEQ is computationally possible or practical given available resources at the receiver. With the selected sampling frequency, one can explore whether a TEQ can be implemented based on the computation resource available at the receiver. If the answer is yes, then the process turns to evaluate how long the TEQ should be run. This decision will be further used to determine the size of the cyclic extension. In various embodiments, the object is to minimize the size of the cyclic extension for the TEQ to handle the predicted ISI.

In various embodiments, communication between transmitter and receiver may be accomplished as follows. Decisions, such as described above, made by the receiver 204 may be communicated to the transmitter 202 via the opposite data link, in a pre-specified format. The transmitter 202 may set the size of cyclic extension to be exactly the same as the receiver 204. It is not necessary to exactly match and set the size of IFFT and the sample frequency, although in various embodiments it may be preferable to do so to reduce the implementation complexity.

Referring now to FIG. 3, a flow chart detailing the steps of a method for implementing an adaptive VDSL system in accordance with at least one embodiment of the invention is depicted. The process 300 begins in step 302 and proceeds to step 304. In step 304 the transmitter transmits a training signal. In various embodiments, this may take the form of sending a line probing signal of any kind of form to the line, with its power and/or spectrum shape known to the receiver. Next, in step 306, upon receiving the line-probing signal, the receiver estimates the loop length of the line. As noted herein in various embodiments, this can be done by estimating the received power, or the shape of the received spectrum. Next, in step 308, for greater reliability, the receiver may also estimate the noise level relative to the signal, as a result, the signal-to-noise-ratio (SNR) per sub-carrier may be measured. Next, in step 310, the receiver calculates the maximum usable frequency band based on the loop length or from the estimated SNR per sub-carrier. Then, in step 312, the receiver determines the FFT size to use. If the actual maximum usable bandwidth of the line is small, the size of the FFT will be also small, thereby effectively reducing the computational burden when loop length is longer. At step 314, based at least in part on the FFT size, the receiver sampling frequency may be set accordingly. Then, in step 316, in terms of loop length and available computation resources, the receiver may also make a decision on whether to utilize a time-domain equalizer (TEQ). In various embodiments, if the decision is made to use time-domain equalization, the receiver may also determine the length of the TEQ. In step 318, the size of cyclic extension is determined at the receiver in conjunction with its decision on TEQ. Then, in step 320, the receiver communicates its decisions, including the size of FFT, transmit sampling frequency, and the size of cyclic extension to the transmitter. In step 322, the transmitter sets its transmit sampling frequency, size of cyclic extension, and size of IFFT, respectively. Finally, in step 324 some or all of those settings may be used when the transmitter and the receiver enter into the regular VDSL training state using the previously determined parameters.

Currently known DMT VDSL systems normally consists of three steps in its initialization procedure: i) handshake as specified in G.994.1; ii) training state, and iii) channel analysis and exchange. The procedures according to the various embodiments of the invention described above relating to loop length detection, estimating number of usable sub-carriers, parameter settings, TEQ decisioning communication and transmitter settings may be inserted between conventional steps i and ii. In various embodiments these procedures may also be incorporated into the handshake procedure.

The embodiments of the present inventions are not to be limited in scope by the specific embodiments described herein. For example, although many of the embodiments disclosed herein have been described with reference to systems and methods involving VDSL and DMT in xDSL transceivers, the principles herein are equally applicable to other aspects of signal processing. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A method for performing adaptive xDSL communications comprising:

determining line conditions of a communications channel connecting a transmitter and a receiver, wherein determining line conditions of a communications channel comprises sending a line probing signal from the transmitter to the receiver and estimating a line loop length based on the line probing signal, wherein estimating the line loop length comprises solving the expression $Al=-10 \text{ Log } 10 \text{ (Pr/Pt)}$, where Al is the loop attenuation, Pr is the received power estimated at the receiver and Pt is the transmit power, and the Al is indexed against a pre-populated table correlating loop attenuation and loop length;

estimating a maximum number of usable sub-carrier based on the determined line conditions, wherein the maximum number of usable sub-carrier is indicative of a maximum usable bandwidth spanning from a lowest frequency usable sub-carrier to a maximum frequency usable sub-carrier;

determining a FFT size based at least on part on the maximum number of usable sub-carriers;

based at least in part of the determined FFT size, selecting a receiver sampling frequency;

determining, based at least in part on the line conditions, whether or not to utilize a time-domain equalizer (TEQ), and if so determining the length of the TEQ, and the size of cyclic extension to use; and communicating from the receiver to the transmitter the size of the FFT, the sampling frequency and, if used, the size of the cyclic extension.

2. The method according to claim 1, further comprising setting at the transmitter an IFFT of size equivalent to the size of the FFT, the sampling frequency and the size of the cyclic extension according to the communicated sampling frequency cyclic extension.

3. The method according to claim 2, further comprising initiating an xDSL training routine with the transmitter and receiver set according to the determined settings.

4. The method according to claim 1, wherein sending a line probing signal comprises sending a signal with at least one known property to the receiver.

5. The method according to claim 4, wherein determining line conditions comprises comparing at least one measured property of the line probing signal to the at least one known property.

6. The method according to claim 4, wherein the at least one known property comprises at least one property selected from the group consisting of a power spectrum and shape.

7. The method according to claim 1, wherein estimating the maximum number of usable sub-carrier comprises performing a look up in a predefined look up table that correlates loop length to number of usable sub-carriers.

8. The method according to claim 1, wherein estimating the maximum number of usable sub-carriers comprises estimating a signal to noise ratio (SNR) for each sub-carrier and using the SNR in combination with an intended error rate, determining which sub-carriers may be used and summing the usable sub-carriers to obtain the maximum number of usable sub-carriers.

9. The method according to claim 1, wherein determining line conditions of a communications channel comprises determining a signal to noise ratio (SNR) of each sub-carrier on the channel.

10. The method according to claim 1, wherein selecting a receiver sampling frequency comprises selecting the minimum sampling frequency for the determined FFT size.

11. The method according to claim 1, wherein determining a FFT size comprises selecting a minimum FFT size based on the maximum number of usable sub-carriers.

12. The method according to claim 11, wherein the maximum number of usable sub-carriers is used to select a sampling frequency in accordance with Table 2 and the sampling frequency is used to select the minimum FFT size based on the selected sampling frequency in accordance with Table 1.

13. An adaptive xDSL system comprising:
a first transceiver unit and a second transceiver unit interconnected by a communication channel, wherein the second transceiver is adapted to transmit a training signal to the first transceiver, and the first transceiver is adapted to:
estimate one or more channel characteristics based on the received training signal, the one or more channel characteristics including at least a channel loop length separating the first and second transceiver units;
calculate a maximum usable bandwidth between the first and second transceiver over the channel;
select a minimum size of an FFT to be implemented by the second transceiver unit;
based on the selected size of the FFT, select a minimum sampling frequency;
determine whether, based at least in part on the one or more channel characteristics, a TEQ should be used and, if so, selecting a length of the TEQ and a cyclic extension length, and
transmit to the second transceiver unit determined parameters including the size of the FFT, the sample frequency and, if determined to be necessary, the size of the cyclic extension to use;
wherein the second transceiver is adapted to set an IFFT having a size corresponding to the FFT size and to transmit data to the first transceiver using the determined parameters.

14. A chipset for an adaptive VDSL modem comprising:
circuitry adapted to receive a training signal;
circuitry adapted to estimate a loop length traveled by the training signal based on estimated properties of the received training signal;
circuitry adapted to calculate a maximum usable bandwidth over a communication channel traveled by the training signal;
circuitry adapted to select a sampling frequency based on the maximum usable bandwidth;
circuitry adapted to select a minimum size of an FFT for transforming a DMT-based signal received over the communication channel based at least in part on the selected sampling frequency;
circuitry adapted to determine, based on at least in part on the estimated loop length, whether a TEQ should be used on received signals and, if so, to select a TEQ length and a cyclic extension length; and
circuitry adapted to send a signal back to a transmitting device indicative of the selected sampling frequency, FFT size and if determined, the cyclic extension length.

15. An adaptive xDSL system comprising:
a first transceiver;
a second transceiver in communication with the first transceiver over a communication channel to form a transceiver set;
the transceiver set being adapted to transmit and receive a training signal between the first and second transceivers, and comprising:
means for estimating one or more channel characteristics based on the received training signal, the one or more channel characteristics including at least a channel communication length separating the first and second transceiver units;
means for determining a maximum usable bandwidth between the first and second transceivers over the communication channel;
means for determining a minimum size of an FFT to be implemented by the transceiver set;
means for determining a minimum sampling frequency based at least in part on the selected size of the FFT;
means for determining whether, based at least in part on the one or more channel characteristics, a TEQ should be used and, if so, determining a length of the TEQ and a cyclic extension, and
means for determining an IFFT having a size corresponding to the size of the FFT;
whereby the transceiver set communicates data using the determined parameters.

* * * * *

UNITED STATES PATENT AND TRADEMARK OFFICE
CERTIFICATE OF CORRECTION

PATENT NO. : 7,352,805 B2  Page 1 of 1
APPLICATION NO. : 11/282109
DATED : April 1, 2008
INVENTOR(S) : Langberg et al.

It is certified that error appears in the above-identified patent and that said Letters Patent is hereby corrected as shown below:

In column 14,
  line 9 (claim 1) delete "number of usable sub-carrier" and replace with
    --number of usable sub-carriers--;
  line 11 (claim 1) delete "number of usable sub-carrier" and replace with
    --number of usable sub-carriers--;
  line 45 (claim 7) delete "number of usable sub-carrier" and replace with
    --number of usable sub-carriers--;
In column 16,
  line 5 (claim 14) delete "based on at least in part on" and replace with
    --based at least in part on--.

Signed and Sealed this

Eighth Day of July, 2008

JON W. DUDAS
*Director of the United States Patent and Trademark Office*